US011627721B2

(12) United States Patent
Espinoza et al.

(10) Patent No.: US 11,627,721 B2
(45) Date of Patent: Apr. 18, 2023

(54) IMPROVING DETECTION, PREVENTION, AND REACTION IN A WARNING SYSTEM FOR ANIMAL FARROWING OPERATIONS

(71) Applicant: SwineTech, Inc., Cedar Rapids, IA (US)

(72) Inventors: Abraham Espinoza, Iowa City, IA (US); Matthew Rooda, New Sharon, IA (US); John Rourke, Cedar Rapids, IA (US); John Raid, Cedar Rapids, IA (US)

(73) Assignee: SwineTech, Inc., Solon, IA (US)

( * ) Notice: Subject to any disclaimer, the term of this patent is extended or adjusted under 35 U.S.C. 154(b) by 420 days.

(21) Appl. No.: 16/769,039

(22) PCT Filed: Jul. 31, 2018

(86) PCT No.: PCT/US2018/044616
§ 371 (c)(1),
(2) Date: Jun. 2, 2020

(87) PCT Pub. No.: WO2019/133073
PCT Pub. Date: Jul. 4, 2019

(65) Prior Publication Data
US 2020/0329663 A1   Oct. 22, 2020

Related U.S. Application Data

(60) Provisional application No. 62/635,832, filed on Feb. 27, 2018, provisional application No. 62/611,615, filed on Dec. 29, 2017.

(51) Int. Cl.
*A01K 1/02*     (2006.01)
*A01K 29/00*    (2006.01)
*A01K 11/00*    (2006.01)

(52) U.S. Cl.
CPC .......... *A01K 1/0218* (2013.01); *A01K 29/005* (2013.01); *A01K 11/006* (2013.01)

(58) Field of Classification Search
CPC .... A01K 29/005; A01K 27/009; A01K 29/00; A01K 1/0218; A01K 1/0209; A01K 7/06;
(Continued)

(56) References Cited

U.S. PATENT DOCUMENTS 585,525 A * 6/1897 Kellog ..................... A61B 7/02
4,651,677 A * 3/1987 de Wit ................. A01K 1/0218
                                                119/505

(Continued)

FOREIGN PATENT DOCUMENTS

| CN | 205541322 U | 8/2016 |
| DE | 3423934 C1 | 8/1985 |
| WO | 2017058893 A1 | 4/2017 |

OTHER PUBLICATIONS

International Search Report and Written Opinion dated Jul. 11, 2018 for International Patent Application No. PCT/US2018/044616.

*Primary Examiner* — Peter M Poon
*Assistant Examiner* — Jeffrey R Larsen
(74) *Attorney, Agent, or Firm* — Shuttleworth & Ingersoll, PLC; Jason Sytsma

(57) ABSTRACT

A detector for detecting a signal from one or more feeders. A processor is in communication with the can be configured with an artificial intelligence module and a library of pre-recorded action events and for comparing the signal with the library of pre-recorded action events and determining a likely action event. A warning device can be in communication with the processor for providing an output in response to the likely action event. At least one false positive sensor in communication with either the processor or the warning device or both of the processor and the warning device can (Continued)

be used for stopping the output from the warning device upon a predetermined condition.

31 Claims, 8 Drawing Sheets

(58) Field of Classification Search
CPC ....... A01K 1/0227; G10L 17/26; G10L 25/63; A61D 17/00; A61D 17/008
USPC ...... 119/61.5, 859, 718, 792, 856, 503, 505, 119/421
See application file for complete search history.

(56) References Cited

U.S. PATENT DOCUMENTS

| | | | | |
|---|---|---|---|---|
| 5,778,082 A * | 7/1998 | Chu | ........................ | H04S 1/007 348/E7.083 |
| 6,535,131 B1 * | 3/2003 | Bar-Shalom | ......... | A01K 29/005 340/573.2 |
| 6,681,023 B1 * | 1/2004 | Turnbull | ................ | H04R 1/342 381/338 |
| 2003/0125946 A1 * | 7/2003 | Hsu | ........................ | G10L 17/26 704/E17.002 |
| 2004/0107104 A1 * | 6/2004 | Schaphorst | ........... | G10L 15/183 704/E17.002 |
| 2007/0221137 A1 * | 9/2007 | Lareau | ................... | A01K 15/02 119/503 |
| 2009/0191521 A1 * | 7/2009 | Paul | ....................... | A61B 5/165 600/300 |
| 2010/0000395 A1 * | 1/2010 | Walker, II | ............ | G10H 1/0008 84/616 |
| 2012/0130711 A1 * | 5/2012 | Yamabe | .................. | G10L 25/78 704/E15.001 |
| 2014/0174376 A1 * | 6/2014 | Touchton | ............. | A01K 29/005 119/719 |
| 2015/0097668 A1 * | 4/2015 | Toth | ................... | A61B 5/02438 600/300 |
| 2018/0071069 A1 * | 3/2018 | Mikkelsen | ............... | G01V 8/10 |
| 2019/0125509 A1 * | 5/2019 | Hotchkin | ................ | H04W 4/029 |
| 2020/0043309 A1 * | 2/2020 | Thörn | .................... | G08B 25/08 |

* cited by examiner

IMPROVING DETECTION, PREVENTION, AND REACTION IN A WARNING SYSTEM FOR ANIMAL FARROWING OPERATIONS

This application is the National Phase of International Application PCT/US2018/044616 filed Jul. 31, 2018 which designated the U.S.

This application claims priority to U.S. Provisional Patent Application No. 62/635,615 filed Dec. 29, 2017 and U.S. Provisional Patent Application No. 62/635,832 field Feb. 27, 2018, which applications are incorporated by reference herein.

BACKGROUND

This disclosure relates to a warning system for animal farrowing operations and, more specifically, this disclosure relates to a system with enhanced sensors to improve detection, prevention, and reaction when a feeder, (e.g., a nursing piglet) is in danger of being crushed by its mother.

In animal farrowing, there is always the problem of the mother crushing the newly born feeder when the mother lies down or when, while lying down, she changes from one position to another; for example, pre-weaned piglet mortality, as a result of being crushed by the sow in a farrowing enclosure, accounts for a 7% to 10% loss of all piglets that are farrowed. This loss translates into reduced potential profits for the pork producer.

Attempts have been made to solve this problem with electrical or electronic sensing and warning devices that detect noise from the squealing feeder followed by an electrical impulse to the mother to cause her to switch positions, hopefully off of the endangered feeder. Such devices have previously relied on a stored acoustical signal of a squealing feeder to compare with the sound from the endangered, squealing feeder. Feeders, however, rarely make the same sound, especially as they age (even from day to day after birth) or across breeds. A piglet, for example, that is one day old sounds very different than a piglet two, three, or four days old. Piglets of different breeds sound different too. Furthermore, when such devices are put into practice where there are dozens of sows and hundreds of piglets in an enclosed confinement building comprising a myriad of structures, concrete floor, and aluminum and steel siding and frame, the acoustics of the confinement building present a non-trivial problem to overcome.

SUMMARY

Disclosed is a warning system and method for preventing injury to feeders by a mother in an animal farrowing location. The system includes a vibratory detector for detecting a vibratory signal from one or more feeders. A processor in communication with the vibratory detector can be configured for determining from at least one characteristic of the vibratory signal a possible action event and for determining from a pattern of possible action events a likely action event. A warning device can be in communication with the processor for providing an output in response to the likely action event. At least one false positive sensor in communication with either the processor or the warning device or both of the processor and the warning device can be used for stopping the output from the warning device upon a predetermined condition.

In another implementation, the system can comprise a detector for detecting a signal from one or more feeders, where the detector can be a vibratory detector for detecting a vibratory signal, or a camera and the signal is a visual signal. A processor in communication with the detector can be configured with an artificial intelligence module and a library of pre-recorded action events and for comparing the signal with the library of pre-recorded action events and determining a likely action event. Similarly, a warning device can be in communication with the processor for providing an output in response to the likely action event.

The at least one false positive sensor can include a discrete switch for stopping the output from the warning device for the health or safety of the mother. An accelerometer can be worn by the mother such that no movement of the mother within a predetermined period of time prior to the likely action event is the predetermined condition for stopping the output from the warning device.

The at least one false positive sensor can include a transceiver that can be used in communication with the processor and in communication with a separate warning system for detecting a vibratory signal from one or more separate feeders in a separate location. In such an instance, in response to receiving an "it is me" signal from the separate warning system, which indicates that the separate warning system detected the vibratory signal from the one or more separate feeders in the separate location, the transceiver communicates to the processor the predetermined condition for stopping the output from the warning device. A comparator can be provided in communication with the processor and with the transceiver and for receiving from the processor a vibratory signal level of the vibratory signal and for receiving from the transceiver a separate vibratory signal level from the separate warning system for detecting the vibratory signal from one or more separate feeders in the separate location, wherein the comparator compares the vibratory signal level to the separate vibratory signal level. The predetermined condition for stopping the output from the warning device can occur when the separate vibratory signal level is greater, or occurs earlier, than the vibratory signal level.

The at least one false positive sensor can include a timer for stopping the output from the warning device in the event a prior output occurred within a pre-determined period of time. It can also include a thermometer worn by the mother for determining a temperature of the mother and wherein the predetermined condition for stopping the output from the warning device occurs when the temperature of the mother exceeds a predetermined threshold. It could even include a camera in communication with the processor for taking pictures of the mother and determining a relative position between the mother and the one or more feeders, wherein the predetermined condition for stopping the output from the warning device occurs when the relative position indicates that the likely action event is a false positive.

DETAILED DESCRIPTION

Figure 1:
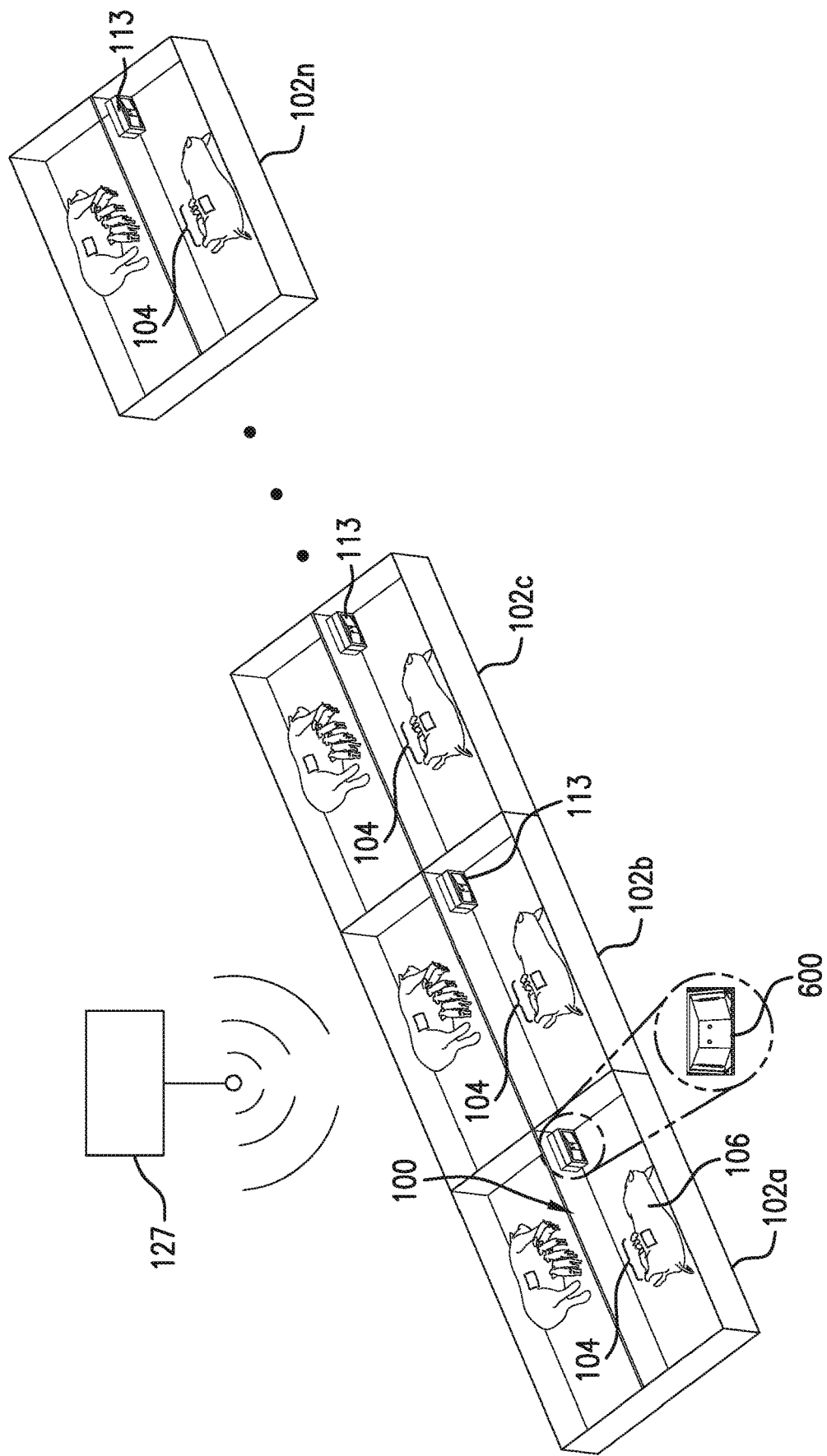
FIG. 1 is a diagrammatic view of a farrowing pen with a warning system for preventing injury to feeders by a mother in an animal farrowing location.

Disclosed is a system and method for improving detection, prevention, and reaction in a system designed to prevent injury to feeders by a mother in an animal farrowing location. Feeder(s) throughout this disclosure refers to a baby animal, such as a piglet, calf, lamb or the like that is nursing from its mother. The system is intended to reduce the incidence of feeder mortality due to "lay-ons" (i.e., when a feeder is underneath the mother and becomes trapped when she lies down) by reducing false-positives (i.e., a false indication that a lay-on is occurring). In International Patent Application No. PCT/US2016/054145 filed on Sep. 28, 2016, the contents of which are hereby incorporated by reference herein, a system and method is disclosed that stimulates the mother to stand up when the system or method detects a likely action event, such as a squeal, tremor, convulsion, etc., that is indicative of the feeder being in danger. A false-positive, however, can provide stimulation to the mother to stand up when, in fact, it is not necessary. This could have an undesirable effect of conditioning the mother to the stimulations so that she no longer reacts.

The illustrated embodiment with accompanying disclosure is directed to detecting a piglet squeal that is indicative of the piglet being laid upon by its mother, with the understanding that the system and method herein described are applicable for other types of nursing animals in a time period from birth until weaning, corresponding to the farrowing period in swine operations.

It has been found that a piglet in distress from being laid upon squeals with a specific frequency, magnitude and duration in a specific pattern. The system and method herein described detects a likely action event (e.g., piglet squeals that are indicative of the piglet being laid upon by its mother) from a pattern of possible action events (e.g., squeals with at least one characteristic indicative of the piglet being laid upon by its mother, wherein the characteristics are frequency, magnitude, and duration of the squeal). The pattern is a predetermined number of cycles between a feeder squeal event, and a feeder non-squeal event where a feeder squeal event refers to the sound that a piglet makes in distress from being laid upon and a feeder non-squeal event refers to a breath or other noise or squeal from a piglet not indicative of a squeal event of a piglet being laid upon.

With respect to a particular breed of domesticated piglets, it has been found that the predetermined number of cycles of squeal events and non-squeal events to indicate a likely action event is at least seven and less than or equal to twenty in eight seconds. This predetermined pattern between squeal events and non-squeal events may hold true for all, some, or no other breeds of piglets and other feeders; however, one skilled in the art would recognize and be able to adapt the predetermined number of cycles of squeal events and non-squeal events to correspond with other breeds of piglets or other types of feeders, if necessary. Based on this pattern of predetermined number of cycles of squeal events and non-squeal events, the system and method can react with the cooperation of a warning device to provide an output to the mother in response to the likely action event.

FIG. 1 shows a diagrammatic view of a number of farrowing pens 102a. 102b. 102c . . . 102n each with a warning system 100 for preventing injury to feeders 104 by a mother 106 in an animal farrowing location.

Figure 2:
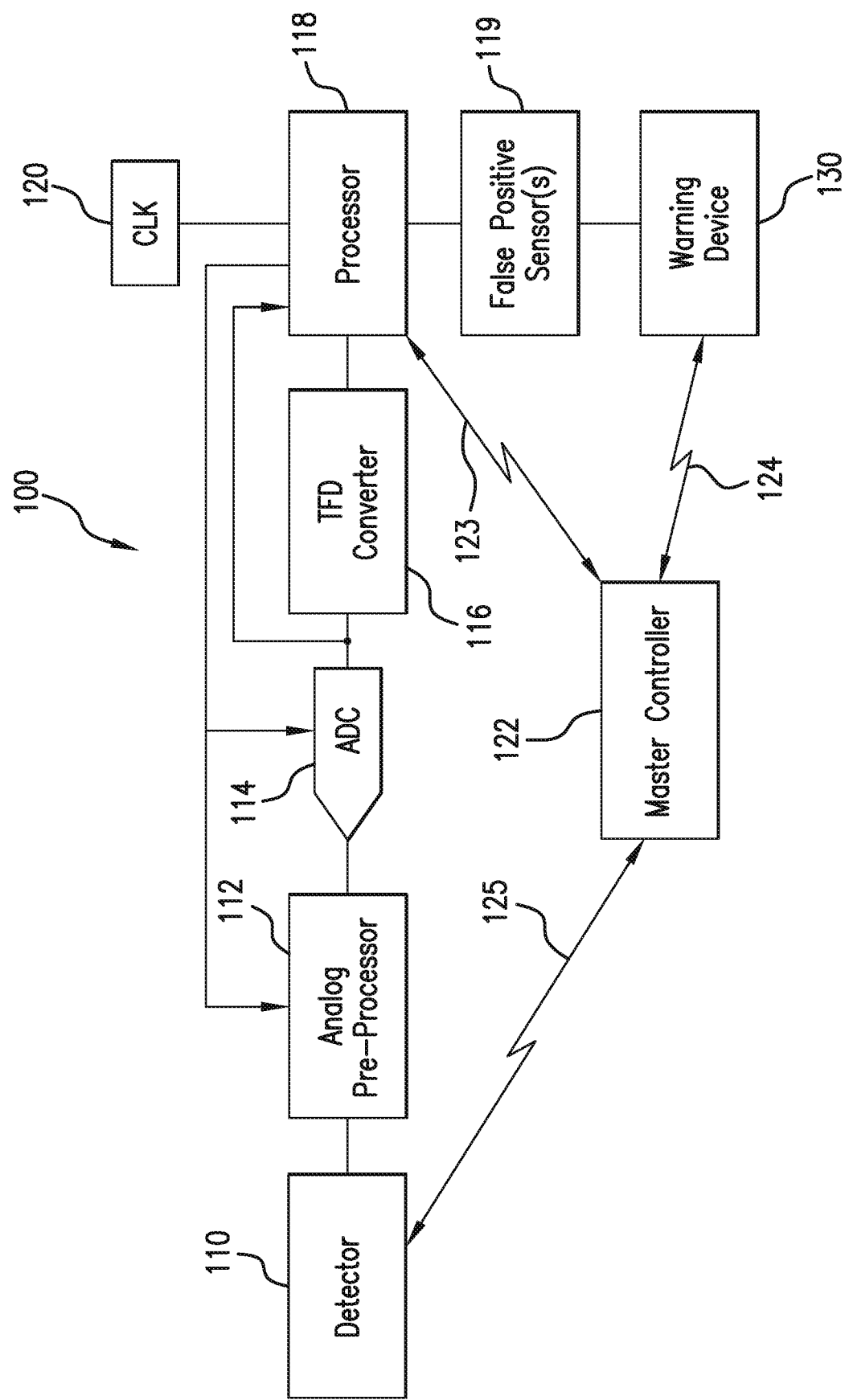
FIG. 2 is a block diagram of the system for preventing injury to feeders by a mother in an animal farrowing location shown generally in FIG. 1.

FIG. 2 shows a block diagram of warning system 100 of FIG. 1. Warning system 100 includes a detector 110 that can detect a vibratory signal from one or more feeders 104 in farrowing pen 102. Detector 110 can be a microphone, laser, accelerometer, strain gauge or other type of vibratory sensor that responds to acoustic pressure or vibration created by feeders 104 when squealing. In the illustrated embodiment, detector 110 can be one or two microphones positioned near feeders 104 in a portable housing 113 (shown in FIG. 1).

An analog preprocessor 112 preprocesses the vibratory signal detected by detector 110 before it is converted into a digital signal by an analog-to-digital convertor ("ADC") 114. Analog preprocessor 112 can include any number of analog devices, such as a series of low pass or band-pass filters tuned for a pass-bad corresponding substantially to the frequency range for the squealing piglet (typically, but not limited to, 1500 to 4500 Hertz for a domesticated piglet (and any value in between), and amplifiers, such as a low-noise amplifier (LNA) to enhance noise figure performance of the remaining circuitry to further help define the vibratory signal and filter ambient acoustical signals, which may heterodyne onto the target signal. In addition, if the signal is very weak, other conventional signal processing equipment, such as a lock-in amplifier could be used to pull the signal out of the background noise. Alternatively, analog preprocessor 112 can be omitted and the vibratory signal can be sufficiently enhanced through digital signal processing techniques, including digital filtering and amplification. A closed loop system between a processor 118 (discussed below) and analog preprocessor 112 can provide feedback to dynamically modify the filtering characteristics of analog preprocessor 112 to improve squeal detection.

The digital representation of the vibratory signal is processed by a time-to-frequency domain (TFD) converter 116 to derive the frequency contents of the vibratory signal. TFD converter 116 is preprogrammed with instructions for performing a Fourier spectral analysis, such as an FFT (Fast Fourier Transform) or FHT (Fast Hartley Transform), or any other Fourier series decomposition technique. The frequency contents of the vibratory signal are transposed in approximately forty bands of frequencies extending throughout the range of interest of 1500 to 4500 Hertz (Hz) corresponding to the acoustical range of a piglet. The number of bands depends upon the sampling frequency. Other feeders 104 may have a different acoustical range.

A processor 118 is provided for processing the spectral representation of the vibratory signal in the form of a frequency-domain representation of a digitized vibratory signal from ADC 114. The frequency-domain representation of the digitized vibratory signal when decomposed by TFD 116 with an FFT transform function at a sampling rate of 44,100 and 256 samples per set produces 128 frequency bins (wherein a bin is a spectrum sample that defines the frequency resolution). Any useful information relating to a feeder squeal event or a feeder non-squeal event will be found in the bins of interest. With a sampling rate of 44.1K Sa/s and 256 samples, the first forty bins (approximately) comprise the bins of interest. These bins of interest comprise a conversion set that is used for analysis.

A clock 120 provides to processor 118 timing information for the frequency-domain representation of the digitized vibratory signal. The timing information includes a time stamp, which can be to the nearest one-ten-thousandth of a second for each conversion set.

Processor 118 is configured for determining from at least one characteristic of the vibratory signal a possible action event. The characteristics of the vibratory signal can be the frequency, magnitude, and duration of the vibratory signal, or any combination of two or more of those characteristics. In one implementation, from the frequency-domain representation of the digitized vibratory signal, a possible action event can be calculated by processor 118 from a relative magnitude of a plurality of frequency bands from the frequency-domain representation of the digitized vibratory signal. In this regard, the possible action event can occur when (i) the peak magnitude of the plurality of frequency bands is a multiple of the relative magnitude of the plurality of frequency bands from the frequency-domain representation of the digitized vibratory signal, (ii) the peak energy of the frequency-domain representation of the digitized vibratory signal is a multiple of the relative magnitude of the plurality of frequency bands from the frequency-domain representation of the digitized vibratory signal, and (iii) the average amplitude of the frequency domain representation of the digitized vibratory signal is a greater percentage than an average amplitude for a plurality of prior frequency domain representations of the digitized vibratory signal. In one implementation, the peak magnitude of the plurality of frequency bands is four time the relative magnitude of the plurality of frequency bands, the peak energy is three times the relative magnitude of the plurality of frequency bands, and the average amplitude is at least fifty percent greater than the average amplitude.

The conversion set comprising of the bins of interest can also include time domain information, comprising of an average and a peak sound pressure level of the vibratory signal before conversion into the frequency-domain representation of a digitized vibratory signal.

Also, included in the conversion set are other frequency-domain data comprising of the average magnitude of all the frequency bands in the conversion set, the actual magnitudes of each of the predefined targeted band of frequencies (e.g., the 1500 to 4500 Hz frequency range), the average magnitude of all the frequency bands ("average magnitude"), the average magnitude of the targeted frequency bands (e.g., 1500-4500 Hz) ("average target magnitude"), and the peak magnitude of any of the targeted frequency bands ("peak magnitude"), wherein the "band number" of the frequency band which contained the peak magnitude is the "peak band." The average of the magnitude of three frequency bands centered on the peak band contains information about the average energy related to the peak band.

A data smoothing function can be used to reduce the large amount of random measurement error and smooth out the data to remove glitches and other stray artifacts and noise from the signal. Each possible action event is grouped chronologically to create a parametric time slice. The parametric time slice can be any length of time sufficient to reduce the measurement error, glitches, stray artifacts and noise. In one implementation, a parametric time slice is less than or equal to 0.1 seconds, which depends on the speed of the processor. From each parametric time slice, a sum of possible action events can be determined from the average values of the parameters discussed above that are in each conversion set. A buffer is provided to store the sum of possible action events from the successive parametric time slices to create a time-domain representation of the possible action events, which is used to determine the likely action events. In one implementation, the buffer continually stores data from the last eight seconds (but preferably no less than five seconds or more than fifteen seconds), and processor 118 determines the likely action event from the pattern of possible action events contained within the buffer.

Processor 118 can provide data from the buffer back to the analog pre-processor to adjust for noise or other signal artifacts found in the contents of the buffer. The sequence of parametric time slices can be subjected to a secondary TFD process, which then determines that a likely action event is occurring if there is a peak frequency anywhere in the range 0.4 to 1.2 Hz, and if the magnitude of that peak frequency is at least three times the average magnitude of all the frequency bands in that secondary TFD process.

Figure 5A:
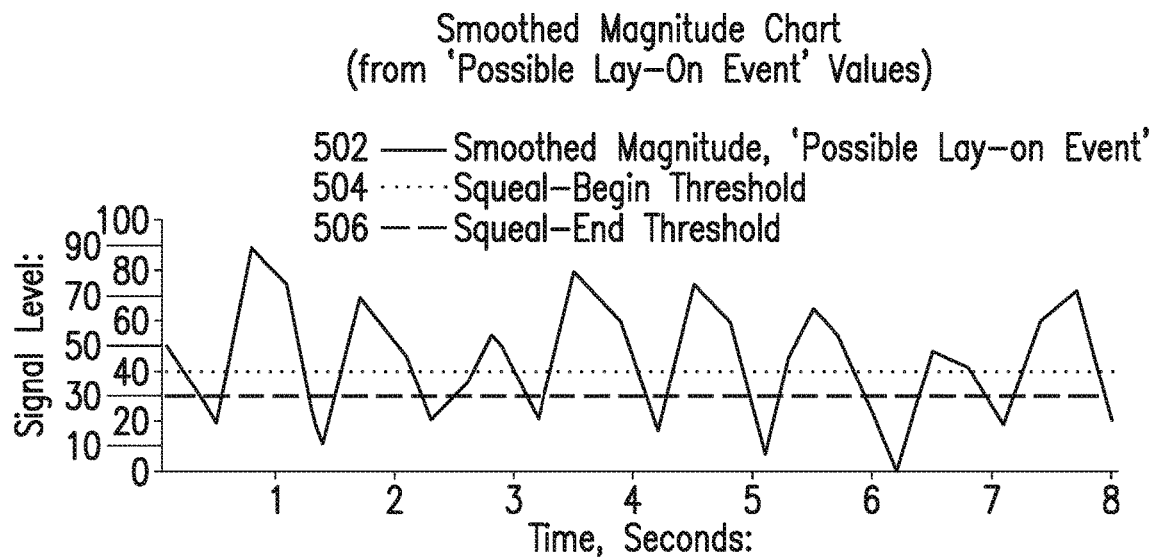
FIG. 5A is a smoothed magnitude waveform of possible action events.
Figure 5B:
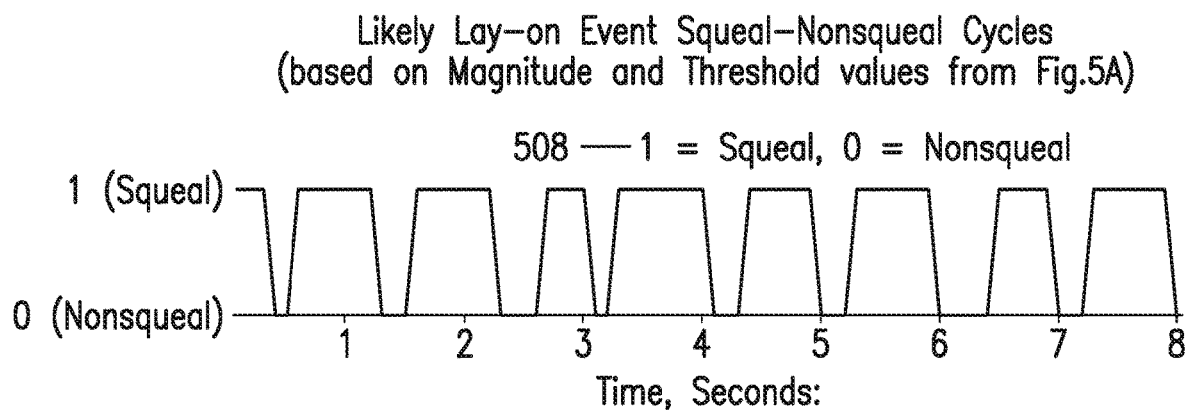
FIG. 5B is a likely action event of a 'squeal'-'non-squeal' signal.

In another implementation, the contents of the buffer can be reviewed in the time-domain to identify a likely action event. With reference to FIGS. 5A and 5B, a signal level 502, a squeal-begin threshold level 504, and a squeal-end threshold level 506 are shown in FIG. 5A, and the 'squeal'-'non-squeal' signal 508 is shown in FIG. 5B. A likely action event occurs according to the following pattern: (i) signal level 502 increases to a level that is greater than the programmable and predetermined action event (e.g. 'lay-on squeal') squeal-begin threshold level 504 for a period of time; during this time, there is a timer ('squeal timer') that starts counting the time slices for a 'squeal'; (ii) the signal level decreases to a level that is less than the programmable and predetermined action event (e.g. 'lay-on breath') squeal-end threshold level 506 (which is always less than the threshold for a squeal-begin 504, to allow for hysteresis), there is a timer ('non-squeal timer') that starts counting time slices for a 'non-squeal;' and (iii) after all time slices in the buffer have been processed, the total number of 'squeal'-'non-squeal' cycles in 'squeal'-'non-squeal' signal 508 are checked by processor 118 to determine whether the number of cycles is at least 0.4 squeals but no more than 1.2 squeals per second (or any range in between), for the sequence of time slices in the buffer comprising no less than a five second or more than fifteen second timespan (or any range in-between) into the past from the current time.

Figure 7:
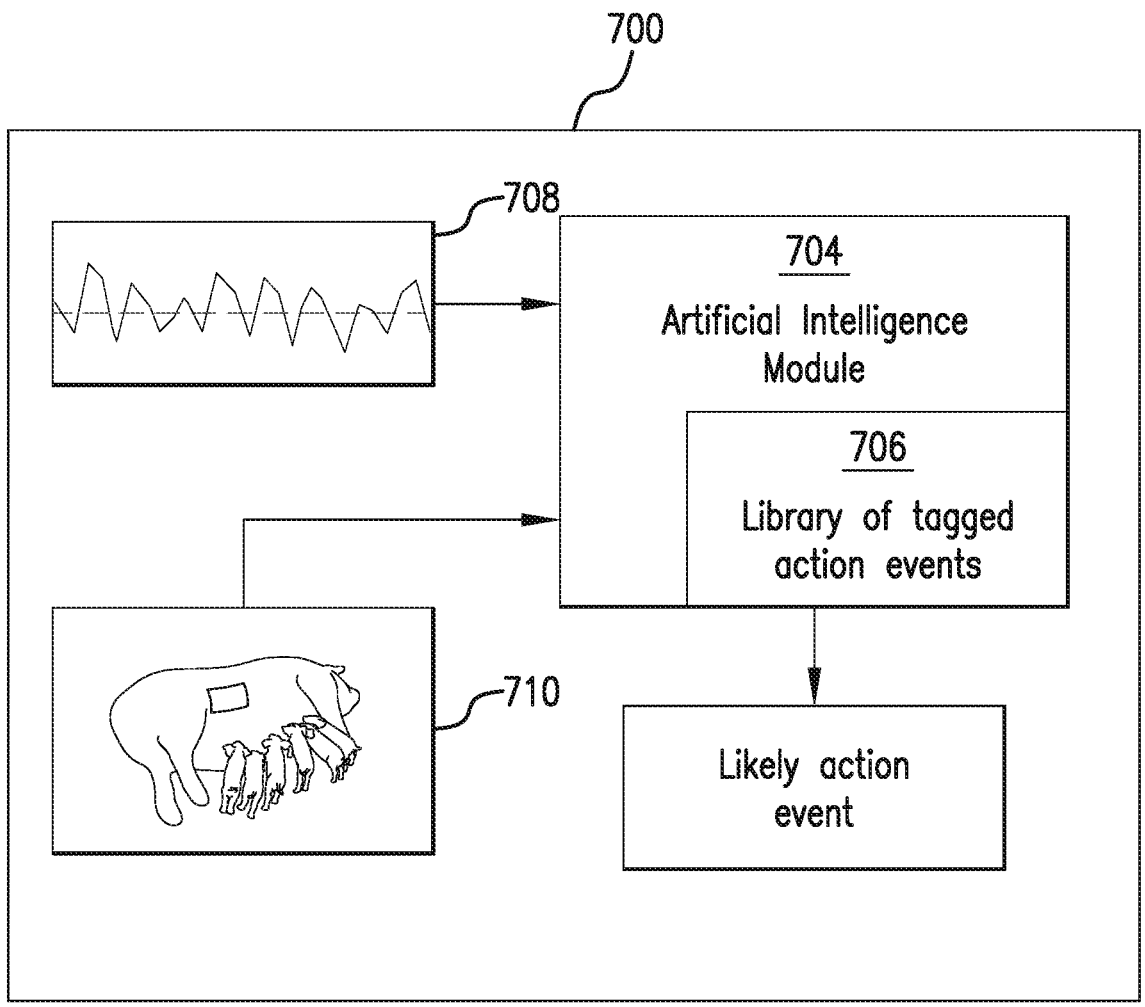
FIG. 7 is a schematic diagram of an illustrative machine learning algorithm in accordance with aspects of the present disclosure.

A machine learning analysis program in may also be used to determine from at least one characteristic of the vibratory signal a possible action event. FIG. 7 shows a machine learning analysis algorithm 700 comprising instructions that are executable on processor 118. Algorithm 700 and related methods are described below as being used by warning system 100. Algorithm 100 can include one or both of an vibratory analysis 702 and an image analysis. System 100 uses detector 110 to detect and record vibratory signals 708 from one or more feeders 104 in farrowing pen 102, as discussed above. Similarly, detector 110 can be a microphone, laser, accelerometer, strain gauge or other type of vibratory sensor that responds to acoustic pressure or vibration created by feeders 104 when squealing.

Accordingly, vibratory signals 708 are recorded continuously and provided to an artificial intelligence (AI) module 704, also referred to as a machine learning or machine intelligence module. AI module 704 may include a neural network (NN), e.g., a convolutional neural network (CNN), trained to determine whether a feeder is squealing in a patter consistent with a layon. Any suitable AI method and/or neural network may be implemented, e.g., using known techniques. For example, a fully convolutional neural network for image and sound recognition may be implemented using the TensorFlow machine intelligence library.

AI module 704 includes a library of pre-recorded action events. Within this library, each individual recording is tagged to identify and tag the point in time when the layon started and ended to create a tagged library set 706. AI module 704 uses this tagged library set 706 to compare in real-time vibratory signals 708 that are recorded continuously and provided to an artificial intelligence (AI) module 704. From this comparison, the neural network may provide a confidence level with respect to its determination that a layon event is occurring. In other words, processor 118 comprising AI module 704 is in communication with detector 110 and is configured for determining from at least one characteristic of vibratory signal 708 a possible action event in the form of a layon and for determining from a library of action events, which can be in the form of the tagged library set 706, a likely action event in the form of a layon.

AI module 704 includes a can also include a library of visual pre-recorded action events, which can be in the form of an image/video library. Within this library, each individual recording is tagged to identify and tag the point in time when the layon started and ended to create a tagged library set 706. AI module 704 uses this tagged library set 706 to compare in real-time image signals 708 from a camera that are recorded continuously and provided to an artificial intelligence (AI) module 704. From this comparison, the neural network may provide a confidence level with respect to its determination that a layon event is occurring. In other words, processor 118 comprising AI module 704 is in communication with detector 110 in the form of a camera and is configured for determining from at least one characteristic of image signal 710 a possible action event in the form of a layon and for determining from a library of action events, which can be in the form of the tagged library set 706, a likely action event in the form of a layon.

Processor 118 can perform error checking on the likely action event so that the probability of a likely action event is more certain. Upon a likely action event (e.g., when there are between 7 and 20 (inclusive) 'squeal'-'non-squeal' cycles), two or more factors can be checked: (i) whether the average 'squeal'-to-'non-squeal' ratio is at least one (i.e., the non-squeal is of shorter duration than the squeal); and (ii) whether the peak length of a 'squeal'-'non-squeal' cycle is no more than 1.5 times the length of the average 'squeal'-'non-squeal' cycle in this sequence. If the answer to these two factors is yes, then there is an increased probability that the likely action event is an actual action event, i.e. that the likely action event corresponds to an actual lay-on of the squealing feeder.

Figure 2A:
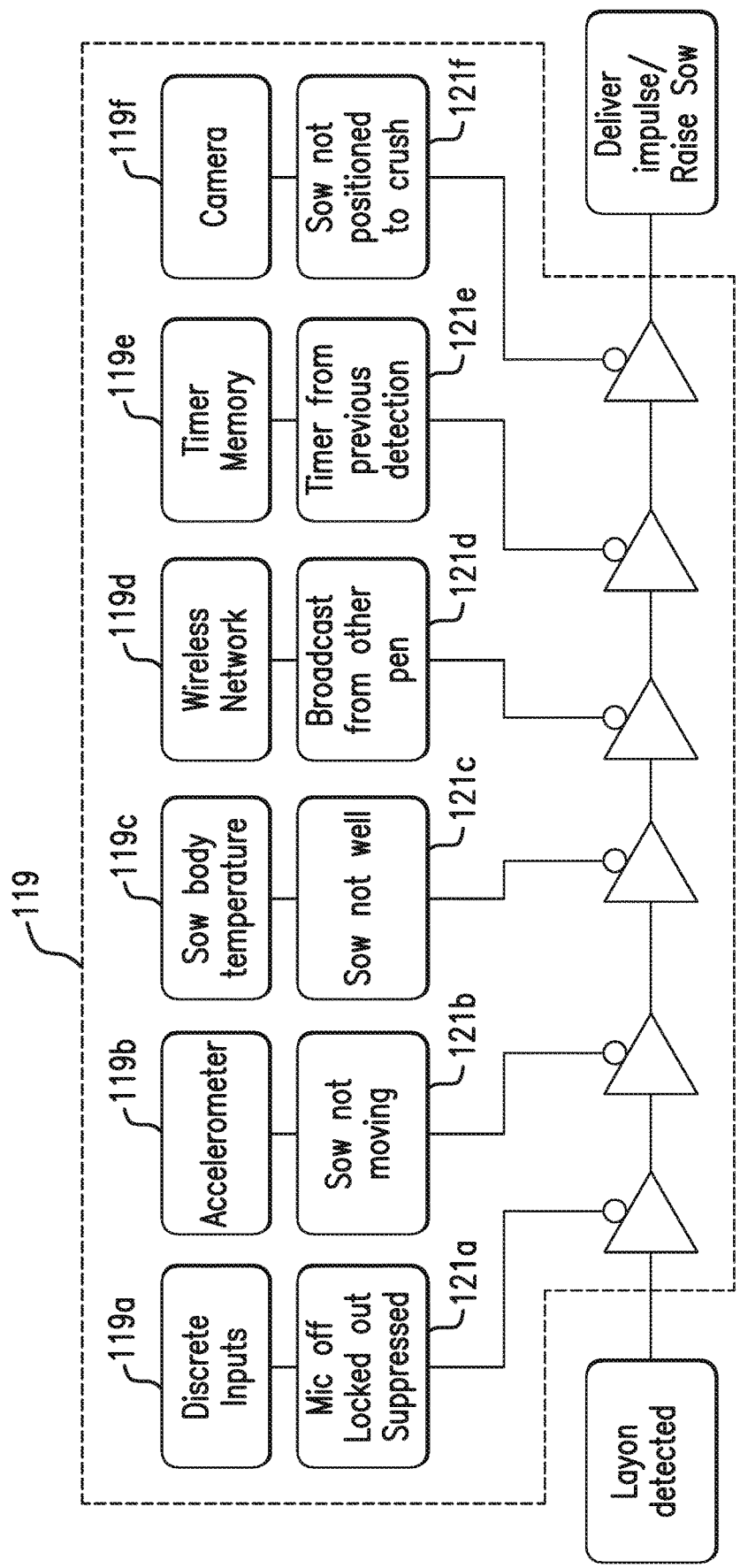
FIG. 2A is a block diagram of the false positive sensors of FIG. 1 to improve error detection of the system of FIG. 2.

Warning system 100 of FIG. 1 can also contain one or more false positive sensors 119 to add an additional layer of error checking. False positive sensors 119 are shown more specifically in FIG. 2A. False positive sensors 119 can be positioned as a safety measure between the likely action event (i.e. a lay-on event detected) and the actual delivery of the output provided by the warning device 130 in response to the likely action event. False positive sensors 119 can contain one or more different types of sensors 119a, 119b, 119c . . . 119n and associated software 121a, 121b, 121c . . . 121n to decrease the amount of false positives. In one implementation, false positive sensor 119 is in communication with either processor 118 or warning device 130 or both of processor 118 and warning device 130 for stopping the output from warning device 130 upon a predetermined condition. When the predetermined condition is met, the appropriate signal can be to a corresponding inverter to stop warning device 130 from delivering an output.

False positive sensors 119 can include one or more discrete input(s) 119a. Discrete inputs 119a can be individual switches to perform different functions, such as a switch to turn the microphone off so that warning system 100 will no longer monitor for sounds. Another switch can provide a manual lockout, which can be use, for example, if it is determined that a particular mother has received too many outputs from warning device 130. Another discrete input can suppress warning system 100 for a particular mother for any number of reason, including, but not limited to, a determination that a particular mother has received too many outputs from warning device 130, a determination that warning system 100 is processing too many false positives, or that there is something else going on as determined by the operator that might trigger a false positive. Each of or one or more of discrete inputs 119a can be actual physical switches that are manually switched or they can be software defined switches 121a residing in processor 118 that are manually or automatically activated.

False positive sensors 119 can include an accelerometer, gyrometer, or tilt sensors 119b to determine if the mother is or was recently moving. Accelerometer 119b can be worn by the mother in a manner addressed below or in any other manner. Software 121b residing on processor 118 can, for example, in response to a likely action event refer to a data log for movement in a predetermined period of time (e.g., 30 seconds) before the likely action event. If there was movement during this period of time and no current movement, then this would be indicative of a likely action event and not a false positive. If, however, there was no movement in the prior predetermined period of time, this would indicate that the mother has not been moving and is not likely lying on a feeder. This would indicate a false positive and the command to deliver an output from warning device 130 could be stopped.

False positive sensors 119 can include one or more thermometers 119c worn by the mother in a manner addressed below or in any other manner. Thermometers 119c can be used to gather body temperature information for software 121c residing on processor 118 to use to determine the health of the mother. If it is determined that the health of the mother is poor, any command to deliver an output from warning device 130 could be stopped. Body temperature information could also be used to confirm a likely action event or a false positive, for example, an increase in body temperature information could be used to detect the presence of a feeder which could confirm a likely action event.

False positive sensors 119 can include a wireless network 119d with software 121d residing on processor 118 to analyze data and information from other warning system 100a, 100b, 100c . . . 100n. In one implementation, all of warning system 100a, 100b, 100c . . . 100n communicate back and forth to share information among and between themselves. This can be done, for example, through a central transceiver 127 (as shown in FIG. 1). Two or more warning system 100a, 100b, 100c . . . 100n can each detect a likely action event but by sharing information it could be determined that one of the detected likely action events is actually a false positive from, for example, warning system 100a actually detecting the likely action event of warning system 100b. In such a case, the output from warning device 130 in warning system 100a could be stopped. One way in which this could be implemented is that each processor 118 in each of warning system 100a, 100b, 100c . . . 100n can look at some form of the magnitude of the vibratory signal with warning system 100a, 100b, 100c . . . 100n detecting the highest magnitude being the one that is closest to the mother where the layon is occurring. If, for example, warning system 100a detected the highest magnitude of the vibratory signal, warning system 100a could communicate through its adapter for its wireless network 119a an "it is me" signal to the adapter for the wireless network 119b, 119c . . . 119n in the other warning system 100b, 100c . . . 100n, respectively, to suppress the output from their respective warning device 130 as having detected a false positive. This could be done, for example, by a hardware or software comparator in communication with processor 118 and with transceiver 127. The comparator receives from processor 118 a vibratory signal level of the vibratory signal and receives from a transceiver 127 a separate vibratory signal level from the separate warning system 100b, 100c . . . 100n. The comparator can then compare the vibratory signal level to the separate vibratory signal level. In such a case, the predetermined condition for stopping the output from warning device 130 occurs when the separate vibratory signal level is greater than the vibratory signal level.

False positive sensors 119 can include a timer 119e with corresponding software 121e for determining the time between the current detection of a likely action event and the previous time. This can be useful, for example, to make sure that there is a predetermined amount of time between outputs from warning device 130. So, for example, if an output from warning device 130 was given 15 seconds before the current detection of a likely action event, timer 119 could be used to stop the output from warning device 130.

False positive sensors 119 can include a camera 119f and corresponding image detection and analysis software 121f. Camera 119f and software 121f can be used to determine, for example, the relative position of the mother to the ground or to the other feeders. So, if the mother is standing, it could easily be determined that the determination of a likely action event is in fact a false positive and the output from warning device 130 can be stopped. Camera 119f and software 121f could also be used for real-time tracking feeders and the mother for predicting a future occurrence of a likely action event and preventing it before it occurs. Also, pairing such visual information with audio information can increase the accuracy of warning systems 100.

One or more of false positive sensors 119 can be combined to detect when the mother is about to or in the process of birthing. During birthing it is important to not raise a mother under any circumstance to prevent injury to the mother and/or the born or unborn feeders. Accordingly, this becomes another false positive prevention mechanism and protects the welfare of the mother. Warning device 130 can be configured to prevent all means of raising a mother during and immediately after a birthing. Detection of birthing can be accomplished with using at least one of the following methods: tracking movements of the mother with accelerometer 119b from a wearable on the mother and comparing contractions, pushes, and respiration to other birthing events. Alternatively, the heart rate can be compared with respiration and movement from a wearable on the mother and that information can be compared to other past birthing events. Camera 119f can detect images which can be analyzed with an image detection algorithm trained with images of birthing, as described in more detail below. The image detection algorithm could use any means of regression or machine learning where many images of an object are used to train a neural network to evaluate images in real time for birthing. When the mother is birthing all means of attempting to raise the mother will be suppressed until the birthing event is over and the mother has recovered. The birthing event could also send a message to a farm worker to alert them.

False positive sensors 119 are shown in FIG. 1 as being positioned between the output of processor 118 and the input to warning device 130. This is for convenience of illustration. One skilled in the art would recognize that one or more of false positive sensors 119 can be in communication with either processor 118 or the warning device 130 or both of processor 118 and warning device 130 for stopping the output from warning device 130 upon a predetermined condition. The associated software for one or more of false positive sensors 119 can be found in processor 119 or in a separate processor, controller or master controller 122.

Warning device 130 is shown in communication with processor 118 for providing an output in response to the likely action event. Warning device 130 stimulates the mother to stand up with an irritation such as an electrical impulse or vibration, or an auditory or visual irritation. In one implementation, warning device 130 comprises of a "prod" with at least one electrode in contact with the skin of the mother to deliver an electrical impulse. Warning device 130 can be configured to deliver a mufti-stage output wherein a first stage output is an initial irritation to the mother, wherein a second stage output is a stronger irritation. The initial and stronger irritations can be any combination of a vibration or an electrical impulse. Warning device 130 can also be configured to deliver a positive reinforcement to the mother. Such a positive reinforcement may include sending a signal to a remote feed dispenser to open a feed chute to deliver feed. Finally, warning device 130 can also be configured to deliver an alert to the producer that there is an issue in farrowing pen 102. Such an alert may include an RF signal to a transceiver 127 (discussed further below) that relays another RF signal directly or indirectly to a phone call with an automated message or text to the producer through landline or to the producer's mobile device. In this instance, the producer would know that a warning has been triggered in a farrowing pen that needs to be checked out.

Warning device 130 can comprise a bi-directional transceiver for communication with processor 118 over a connection 123 for communicating to processor 118 an "I'm Okay" signal indicative of warning device functioning properly. The "I'm Okay" signal can also provide a confirmation to processor 118 that the action event was received and the output in response to the action event was provided to the mother. The "I'm Okay" signal can also include a low battery status alert.

Warning device 130 can be recharged wirelessly in eight hours or less while placed on a recharging platform. Furthermore, warning device 130 can be paired with processor 118 by sending a special pairing identification command while placed upon a charging platform, after which warning device 130 confirms with both a wireless response to processor 118 and a visual confirmation to the operator by blinking the status LED indicator rapidly.

In one implementation, warning device 130 is housed in a belt unit that is worn around the mid-section of the mother. The belt unit can contain biometric sensors; for example, the belt unit can contain a heartbeat signal to provide visual indication that the belt unit with warning device 130 is ready to receive a signal and conserving power with the indicator light flashing once every one to five seconds in 50 ms bursts. The belt unit can also contain a temperature sensor (as discussed above) to monitor the skin temperature of the mother, a multi-axis gyroscope to monitor relative attitude of the mother, which can be used to determine whether the mother is standing up or lying down, an accelerometer (as discussed above) to monitor motion and any changes in motion, which can be used to determine how active the mother is and to approximate the position and directional attitude of the mother, and an RFID for identification. This biometric sensor data can be sent to processor 118 for later analysis or for downloading by the operator. Warning device 130 can be attached as a wearable to the mother in a number of different manners. Warning device 130 can be configured with an ear tag, worn as an ankle device, surgically implanted, or attached to the skin with medical grade adhesive, stitches, or staples. To the extent that warning device 130 provides an auditory or visual irritation, which does not need to be in contact with the mother for effectiveness, warning device 130 can be positioned proximate to the mother to provide the irritation without irritating other animals.

In another implementation, a master controller 122 can be provided. Master controller 122 can perform all, some, or none of the processing functions of processor 118. In one implementation, master controller 122 can communicate with multiple warning systems 100 in a confinement building. Processor 118 can communicate with master controller 122 over a wired or wireless connection 124. For a wireless connection 124, a Wi-Fi or any other wireless protocol that allows for relatively high bandwidth (64 to 512 Kbps from each processor 118). In one implementation, the 5 GHz frequency band can be used instead of a 2.4 GHz frequency band to minimize interference with other wireless devices in the area. Also, master controller 122 can contain transceiver 127 to facilitate communication between multiple warning systems 100a, 100b, 100c . . . 100n.

Master controller 122 can store data received from processor 118, detector 110, or any other biometric detector that could be used on the feeder or its mother. In this regard, master controller 122 can serve as a database and data-management server for confinement operator, either through applications on master controller 122, or through mobile applications created for the operator to use remotely on a tablet, smartphone or other mobile device.

Master controller 122 can also allow or override likely action events determined by processor 118 when the processor 118 of other warning systems 100 have pending likely action events at approximately the same time to increase the accuracy of each warning system 100. In one implementation, master controller 122 can communicate with processors 118 of other warning systems 100 to receive notifications of impending likely action events. If processor 118 for more than one warning system 100 indicates a likely action event within 100 ms of each other, master controller 122 can query the sound pressure level and timestamp from each warning system 100, and invalidate all but the likely action events originating from warning system 100 with the earliest timestamp. Also, if multiple warning systems 100 communicate a timestamp that is within 2 ms of the earliest timestamp, then master controller 122 can invalidate all the likely action events from each of warning system 100 with such timestamps, except for warning system 100 that communicates the highest sound pressure level.

In another implementation, master controller 122 can communicate wirelessly over connection 125 with each detector 110 of warning systems 100. Master controller 122 can receive data from each detector and perform all the various other functions described in warning system 100.

In one implementation, warning system 100 can be provided in portable housing 113 (shown in FIG. 1). In an embodiment where detector 110 is a microphone, portable housing 113 can comprise a waveguide 600 (shown in FIGS. 6A, 6B) to guide the sound waves to the microphone to improve the accuracy of warning system 100. To further improve the accuracy of warning system 100, two microphones can be used and positioned in waveguide 600 of portable housing 113. With the two microphones, processor 118 can determine a time difference of arrival between the vibratory signals arriving at each of the two microphones to determine a relative position of at least one of the feeders with respect to the two microphones.

Figure 6A:
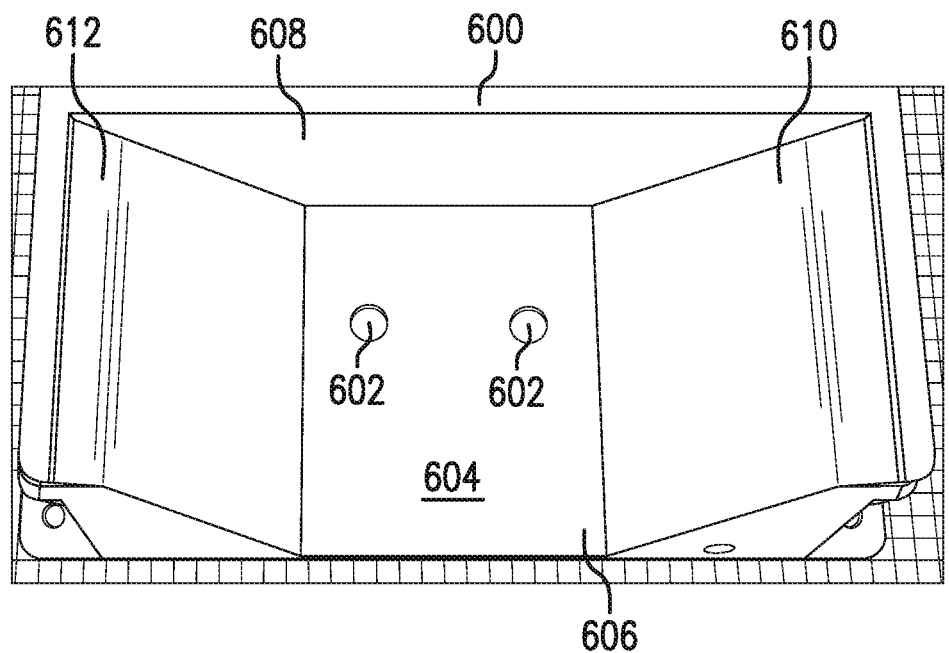
FIG. 6A is a front, perspective view of a waveguide using a fixed angle for the sidewalls of the waveguide, according to an implementation of this disclosure.
Figure 6B:
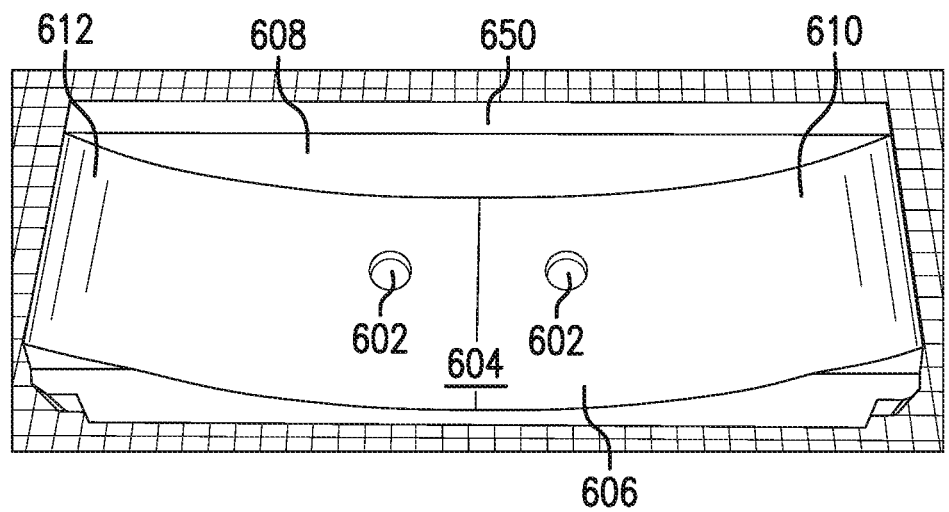
FIG. 6B is a front, perspective view of a waveguide using a varying angle for the sidewalls of the waveguide.

Portable housing 113 with waveguide 600, as shown in FIG. 6A, or waveguide 650, as shown in FIG. 6B, can have two detectors 110 positioned in corresponding receiving holes 602 in a front surface 604 of waveguide 600. In each implementation, front surface 604 is at the bottom of a recessed area 606 that forms an aural waveguide that can be in the shape of a dome, horn or any other shape that accepts an aural vibratory signal from the front of, and below, waveguide 600 while blocking spurious sounds from the sides and above waveguide 600.

Recessed area 606 of waveguide 600 or waveguide 650 can be bounded at the top by a roof 608 to block noise or other spurious sounds from above waveguide 600. In this instance roof 608 functions as a deflector that prevents stray audio from being detected. In waveguide 600, recessed area 606 can be bounded by two walls 610, 612. Wall 610 is on the right side of waveguide 600 and is angled away with respect to front surface 604 at an angle slightly greater than zero degrees to ninety degrees (and any angle in between). Wall 612 is on the left side of waveguide 600 and is angled away with respect to front surface 604 at an angle slightly greater than zero degrees to ninety degrees (and any angle in between). The angle of wall 610 and wall 612 should be small enough to accept sounds from the target feeders 104 directly in front of waveguide 600, and up to approximately two feet to the left and right of waveguide 600. The bottom of recessed area 606 can be left open to accept a maximum aural vibratory signal from the target feeders 104 in the area directly in front of and below waveguide 600. Recessed area 606 can be one to four inches deep (and any value in between), but a depth of 2.5 inches and wall 610 and wall 612 each angled at substantially near 45 degrees is particularly advantageous.

In waveguide 650, recessed area 606 can be one to four inches deep (or any value in between), with a preferred depth of 1 inch. Recessed area 606 can also have an angle from the deepest part of recessed area 606 to either wall varying from 180 (or 0) degrees at the deepest part, and decreasing to a minimum angle of 90 degrees at either wall 610, 612, with the preferred minimum angle at each wall 610, 612 of 135 degrees.

In another implementation, portable housing 113 can also contain a temperature sensor and an AC outlet that can be used to plug in a resistive heating device, for example, a heat lamp. The temperature sensor can comprise a P-N junction device with digital output for fast and accurate detection of temperature. The temperature sensor can be physically positioned either on the bottom or side of portable housing 113 to measure the ambient temperature of the floor area of the farrowing pen where the feeders are located. A heat lamp can be controlled by a zero-crossing solid-state relay (SSR/ZC) to change the power level only when the current is zero to minimize electromagnetic interference and also extend the life of the heating device. In this implementation, processor 118 can adjust the power going to the AC outlet and the heating device, with at least three and up to 100 power levels or more from 0-20% for 'full-off' to 90-100% for 'full-on'. Power changes are accomplished gradually by taking at least 30 seconds to go from 'full-off' to 'full-on', and at least 30 seconds to go from 'full-on' to 'full-off'. In one example, the target temperature can be set initially to 88 degrees Fahrenheit. Processor 118 can contain an option for the operator to change the target temperature on-site through the use of two waterproof switches (Up, Down) connected to processor 118 (this could also be done on a user interface on master controller 122). A 2-digit readout can be provided on portable housing 112 to show the ambient temperature or the desired target temperature. The ambient temperature of the farrowing pen can also be stored in non-volatile secondary storage or communicated to master controller 122 for analysis. A user interface on master controller 122 can also show the operator what the relative temperatures are of each farrowing pen in the confinement at any given time, for better reporting and control of the room environment. Comfort lighting could also be provided for times when no heat is needed. The comfort lighting could be provided by one or more LEDs controlled by processor 118 (or master controller 122). This comfort lighting could be aimed at the area where the feeders normally rest to attract them away from the mother to avoid the danger of being laid on, even when there is no need for the heat lamp to be turned on. In another implementation, portable housing 113 can contain one or more cameras 119f, as previously discussed above.

Figure 3:
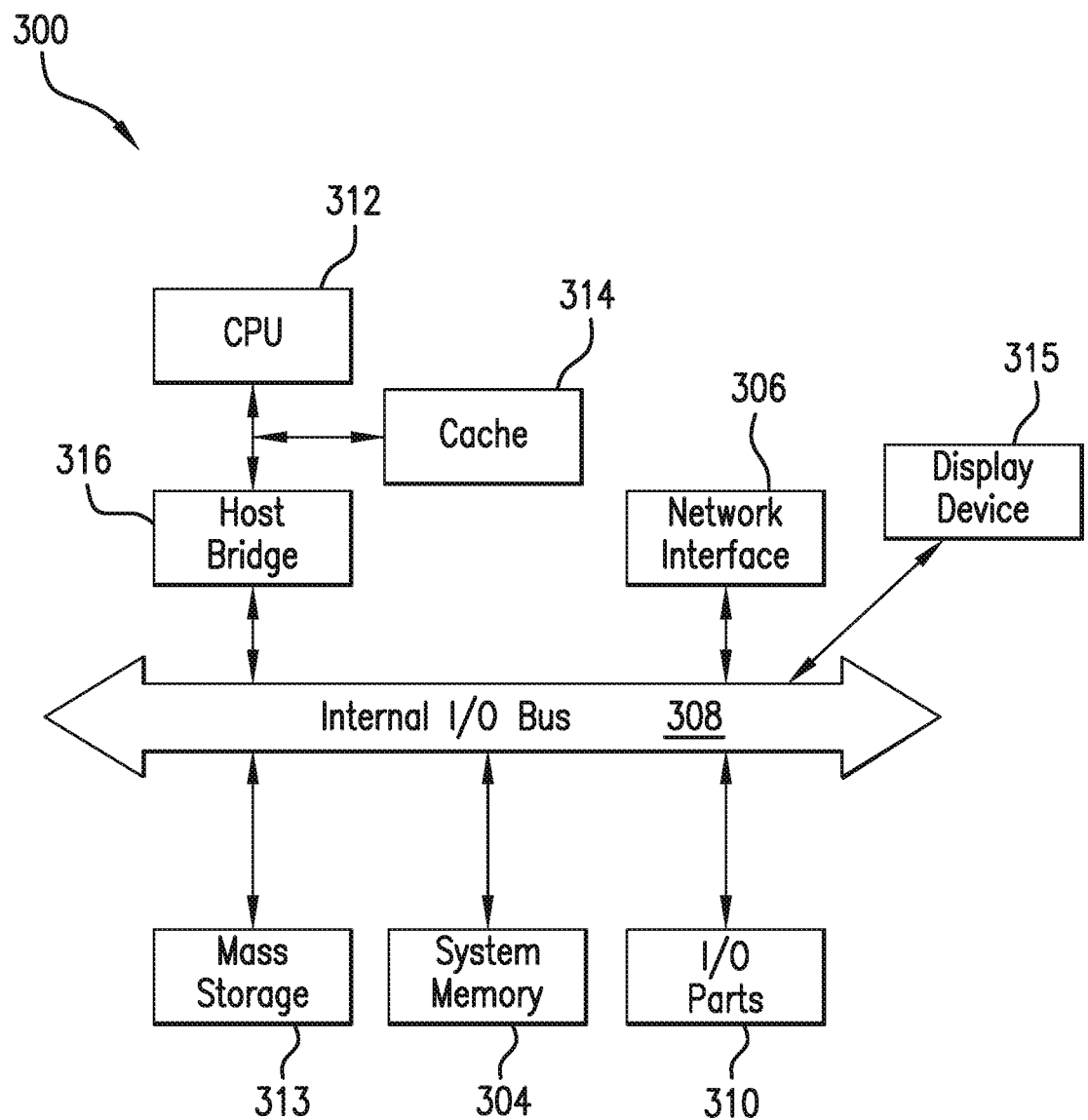
FIG. 3 is a functional block diagram illustrating hardware components of the processor of FIG. 2.

FIG. 3 shows an exemplary computing platform for executing the processing function necessary to derive, calculate, and perform the above functions that are described as being carried out on processor 118 and master controller 122. In one implementation, a processor 300 comprises a system including central processing unit (CPU) 312, a system memory 304, network interface 306 and one or more software applications and drivers enabling or implementing the methods and functions described herein. Hardware system includes a standard I/O bus 308 with I/O Ports 310 and mass storage 313 (which can also be a non-volatile Flash Memory) coupled thereto. Bridge 316 couples CPU 312 to I/O bus 308. The hardware system may further include video memory and display device 315 coupled to the video memory. These elements are intended to represent a broad category of computer hardware systems, including but not limited to general-purpose computer systems based on the Pentium processor manufactured by Intel Corporation of Santa Clara, Calif., as well as any other suitable processor.

Elements of the computer hardware system perform their conventional functions known in the art. In particular, network interface 306 is used to provide communication between CPU 312 and Ethernet networks (or any other network or external device, including master controller 122 or other processors 118). Mass storage 313 can be provided and used to provide permanent storage for the data and programming instructions to perform the above-described functions implementing the test to be carried, whereas system memory 304 (e.g., DRAM) is used to provide temporary storage for the data and programming instructions when executed by CPU 312. I/O ports 310 are one or more serial and/or parallel communication ports used to provide communication between additional peripheral devices, such as ADC 108 and detector 110.

Processor 300 may include a variety of system architectures, and various components of CPU 300 may be rearranged. For example, cache 314 may be on-chip with CPU 312. Alternatively, cache 314 and CPU 312 may be packed together as a "processor module," with CPU 312 being referred to as the "processor core." Furthermore, certain implementations of the claimed embodiments may not require nor include all the above components. Also, additional components may be included, such as additional processors, storage devices, or memories.

Figure 4:
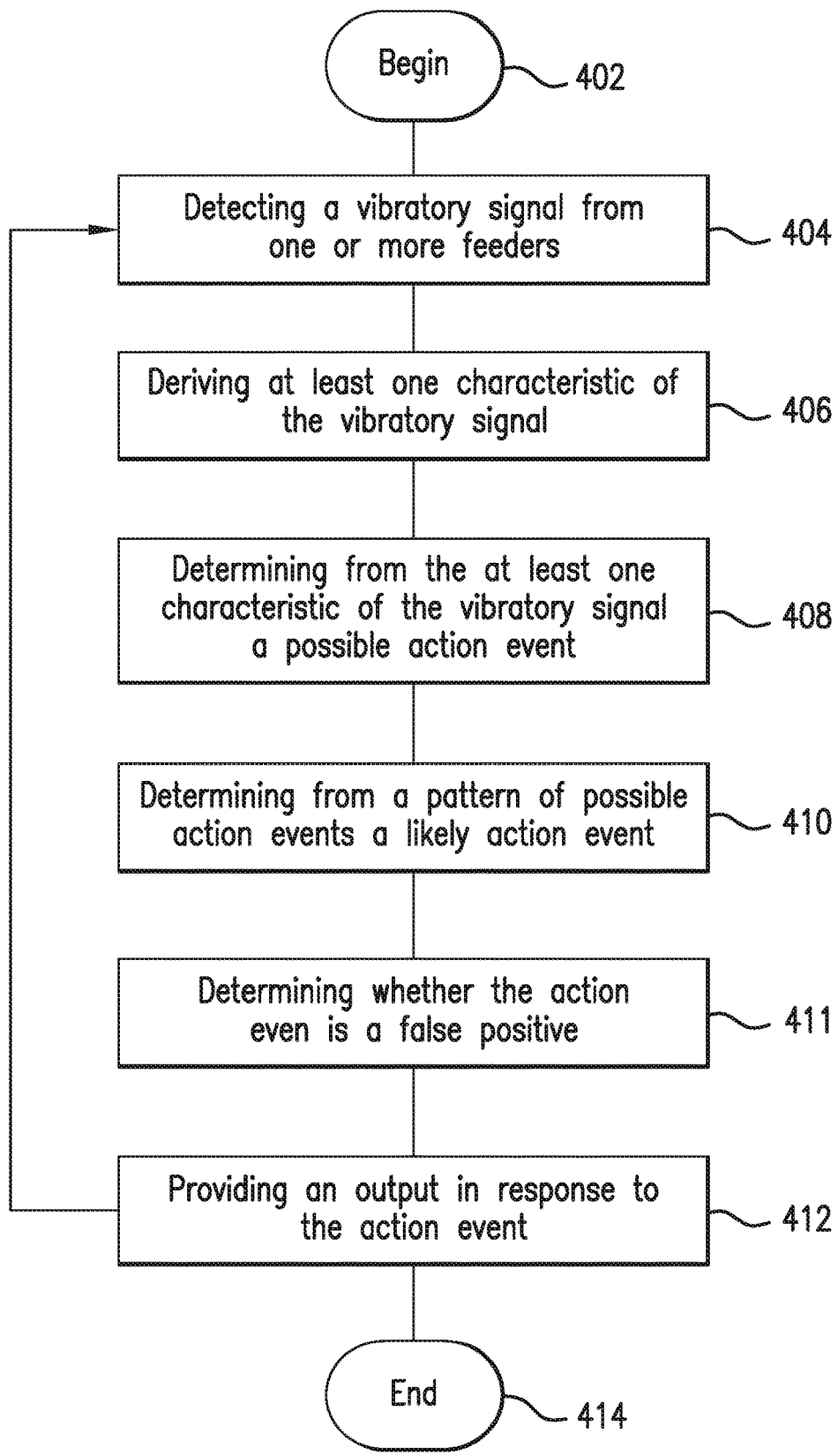
FIG. 4 is a flow chart for processing that can be used for preventing injury to feeders by a mother in an animal farrowing location.

FIG. 4 illustrates a flowchart of overall processing that can be used in systems and methods for preventing injury to feeders by a mother in an animal farrowing location. In 402, processing can begin. In 404, at least one detector 110 detects a vibratory signal emanating from a feeder 104. In 406, processor 118 derives at least one characteristic the vibratory signal. In 408, processor 118 determines from the at least one characteristic of the vibratory signal a possible action event. In 410, processor 118 determines from a pattern of possible action events a likely action event. In 412, a warning device provides an output in response to the action event. There after the method can repeat or end at 414.

The possible action event can be a squeal from a feeder indicative of the feeder being laid upon by the mother, and the likely action event can be a pattern of squeals and non-squeals indicative of the feeder being laid upon by the mother.

The method can further comprise translating the vibratory signal to a frequency-domain representation of a digitized vibratory signal and deriving therefrom an average sound pressure level, a peak sound pressure level, a plurality of frequency bands, an average magnitude of the plurality of frequency bands, and a peak magnitude of the plurality of frequency bands.

The method can further comprise calculating with processor 118 a relative magnitude of the plurality of frequency bands from the frequency-domain representation of the digitized vibratory signal, and wherein the action event can comprise the peak magnitude of the plurality of frequency bands being at least four times the relative magnitude of the plurality of frequency bands from the frequency-domain representation of the digitized vibratory signal, a peak energy of the frequency-domain representation of the digitized vibratory signal being at least three times the relative magnitude of the plurality of frequency bands from the frequency-domain representation of the digitized vibratory signal, and an average amplitude of the frequency domain representation of the digitized vibratory signal is at least fifty percent greater than an average amplitude for a plurality of prior frequency domain representations of the digitized vibratory signal. The pattern of possible action events can be a predetermined number of cycles comprising a feeder squeal event and a feeder non-squeal event, and wherein the predetermined number of cycles can further comprise an average ratio of the squeal event and the non-squeal event that is at least one and a peak length of a one of the predetermined number of cycles is less than 1.5 times a length of an average of each of the feeder squeal event and the feeder non-squeal event in the predetermined number of cycles.

Reference has been made to several components throughout this disclosure as though each component is a unique component. The various systems, converters, processors and controllers can be incorporated into one or more other systems, converters, processors and controllers thereby reducing the number of components; for example, analog preprocessor 112, ADC 114, TFD converter 116 can reside in processor 118. Other implementations and configurations are also contemplated, as discussed further below.

With respect to detector 110, the following implementations are also contemplated. In one implementation, detector 110 is a microphone that is mounted on the inside of the outside wall of portable housing 113 containing warning system 100. The microphone is aimed in the direction of the mother and the feeders feeding on the sow for receiving the audio sound through a hole in the outside wall. In another implementation, two microphones are mounted together as an "xy microphone assembly" at 90 degrees to each other, and located on a physical mounting pylon extending in front of the surface of the outside wall of the housing for warning system 100, and at the midpoint of the outside wall. The microphones are aimed in the direction of the mother and the feeders. This implementation has the effect of increasing sensitivity to audio sounds coming from directly in front of the microphones, compared to any other direction. Alternatively, two microphones can be mounted in an "alternate xy" configuration to the inside face of the outside wall of the housing for warning system 100 for receiving the audio signal through a hole in the wall immediately in front of each microphone, but the wall takes the shape of a "dome" or "horn." Each of the two microphones is mounted at the furthermost point to the left and to the right, respectively for each of the two microphones, of the midpoint of the outside wall, such that each microphone is mounted at a 45-degree angle to the lengthwise plane of the outside wall, so that the plane of each microphone is at a 90-degree angle with the plane of the other microphone.

To increase the signal-to-noise ratio, especially in the direction of the target where the microphone is aimed, the back side of any wall upon which the microphone is mounted, will have a plate of lead or other vibration or resonance-deadening material to reduce the "liveliness" of the wall throughout the audio spectrum, as well as other sound-deadening materials such as, but not limited to, fabric or foam material to attenuate any sound coming from the side or rear direction, with respect to the direction the microphone is aimed.

In another implementation, an omnidirectional microphone is attached directly on the belt unit, which is mounted on the mother. As it is actually attached to the sow, this location will provide the closest location to a laid-on piglet and furthest from piglets in other pens, reducing the incidence of false positives. Alternatively, a directional microphone can be mounted to the inside of the belt worn by the mother, at the point at the top of the belt that is closest to the spine of the mother. This location provides direct transmission of the squeal of the laid-on feeder, through the principle of bone conduction of sound, especially when the feeder's squeal is muffled by the body of the mother when the feeder is completely covered by the mother. In another alternative, a sound horn can be affixed to a directional microphone with the resulting assembly working similarly to a stethoscope, except that it creates an electronic signal and is known as a stethophone. This stethophone is attached to the inside surface of the belt unit worn by the mother in a position that best makes direct contact with the skin of the mother. Because laid-on feeders are also in direct contact with the mother, the squeals from the laid-on feeders will carry a much stronger signal to the stethophone. In this way, signals from any other animal not in direct contact with the mother is much fainter, which virtually eliminates the incidence of false positives.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

The invention claimed is:

1. A warning system for preventing injury to feeders by a mother in an animal farrowing location, the system comprising:
   a vibratory detector for detecting a vibratory signal from one or more feeders;
   a processor in communication with the vibratory detector configured for determining from at least one characteristic of the vibratory signal a possible action event and for determining from a pattern of possible action events a likely action event, wherein the at least one characteristic of the vibratory signal comprises at least one chosen from a frequency and a magnitude of the vibratory signal;
   a warning device in communication with the processor for providing an output in response to the likely action event; and
   at least one false positive sensor in communication with either the processor or the warning device or both of the processor and the warning device for stopping the output from the warning device upon a predetermined condition, wherein the at least one false positive sensor comprises of a transceiver in communication with the processor and in communication with a separate warning system for detecting a vibratory signal from one or more separate feeders in a separate location, wherein in response to receiving an "it is me" signal from the separate warning system, which indicates that the separate warning system detected the vibratory signal from the one or more separate feeders in the separate location, the transceiver communicates to the processor the predetermined condition for stopping the output from the warning device.

2. A warning system for preventing injury to feeders by a mother in an animal farrowing location, the system comprising:
   a vibratory detector for detecting a vibratory signal from one or more feeders;
   a processor in communication with the vibratory detector configured for determining from at least one characteristic of the vibratory signal a possible action event and for determining from a pattern of possible action events a likely action event;
   a warning device in communication with the processor for providing an output in response to the likely action event; and
   at least one false positive sensor in communication with either the processor or the warning device or both of the processor and the warning device for stopping the output from the warning device upon a predetermined condition, wherein the at least one false positive sensor comprises of a transceiver in communication with the processor and in communication with a separate warning system for detecting a vibratory signal from one or more separate feeders in a separate location, and wherein in response to receiving an "it is me" signal from the separate warning system, which indicates that the separate warning system detected the vibratory signal from the one or more separate feeders in the separate location, the transceiver communicates to the processor the predetermined condition for stopping the output from the warning device.

3. A warning system for preventing injury to feeders by a mother in an animal farrowing location, the system comprising:
   a vibratory detector for detecting a vibratory signal from one or more feeders;
   a processor in communication with the vibratory detector configured for determining from at least one characteristic of the vibratory signal a possible action event and for determining from a pattern of possible action events a likely action event;
   a warning device in communication with the processor for providing an output in response to the likely action event;
   at least one false positive sensor in communication with either the processor or the warning device or both of the processor and the warning device for stopping the output from the warning device upon a predetermined condition, wherein the at least one false positive sensor comprises of a transceiver in communication with the processor and in communication with a separate warning system for detecting a vibratory signal from one or more separate feeders in a separate location; and
   a comparator in communication with the processor and with the transceiver and for receiving from the processor a vibratory signal level of the vibratory signal and for receiving from the transceiver a separate vibratory signal level from the separate warning system for detecting the vibratory signal from one or more separate feeders in the separate location, wherein the comparator compares the vibratory signal level to the separate vibratory signal level and wherein the predetermined condition for stopping the output from the warning device occurs when the separate vibratory signal level is greater than the vibratory signal level.

4. The warning system of claim 3, wherein the at least one false positive sensor comprises of a discrete switch for stopping the output from the warning device for a health or safety of the mother.

5. The warning system of claim 3, wherein the at least one false positive sensor comprises of an accelerometer worn by the mother, wherein no movement of the mother within a predetermined period of time prior to the likely action event is the predetermined condition for stopping the output from the warning device.

6. The warning system of claim 3, wherein the at least one false positive sensor comprises of a transceiver in communication with the processor and in communication with a separate warning system for detecting a vibratory signal from one or more separate feeders in a separate location.

7. The warning system of claim 3, and further comprising a timer for stopping the output from the warning device in the event a prior output occurred within a pre-determined period of time.

8. The warning system of claim 3, and further comprising a thermometer worn by the mother for determining a temperature of the mother and wherein the predetermined condition for stopping the output from the warning device occurs when the temperature of the mother exceeds a predetermined threshold.

9. The warning system of claim 3, and further comprising a camera in communication with the processor for taking pictures of the mother and determining a relative position between the mother and the one or more feeders, wherein the predetermined condition for stopping the output from the warning device occurs when the relative position indicates that the likely action event is a false positive.

10. The warning system of claim 3, wherein the at least one characteristic of the vibratory signal comprises at least one chosen from a frequency and a magnitude of the vibratory signal.

11. The warning system of claim 3, and further comprising an analog-to-digital converter ("ADC") for digitizing the vibratory signal from the vibratory detector and creating a digitized vibratory signal and a time-to-frequency domain ("TFD") converter for converting the digitized vibratory signal to a frequency domain representation of the digitized vibratory signal, a clock for providing a timing information for the frequency domain representation of the digitized vibratory signal, wherein the frequency domain representation of the digitized vibratory signal comprises at least one chosen from an average sound pressure level, a peak sound pressure level, the timing information, a plurality of frequency bands, an average magnitude of the plurality of frequency bands, and a peak magnitude of the plurality of frequency bands, wherein the frequency domain representation of the digitized vibratory signal comprises an average target magnitude comprising an average magnitude of a predefined targeted band of frequencies, wherein the processor calculates a relative magnitude of the plurality of frequency bands from the frequency domain representation of the digitized vibratory signal, and wherein the action event comprises the peak magnitude of the plurality of frequency bands being a multiple of the relative magnitude of the plurality of frequency bands from the frequency domain representation of the digitized vibratory signal, a peak energy of the frequency domain representation of the digitized vibratory signal is a multiple of the relative magnitude of the plurality of frequency bands from the frequency domain representation of the digitized vibratory signal, and an average amplitude of the frequency domain representation of the digitized vibratory signal is a percent greater than an average amplitude for a plurality of prior frequency domain representations of the digitized vibratory signal.

12. The warning system of claim 3, wherein the pattern of possible action events is a predetermined average number of cycles per second, wherein each cycle comprising a feeder squeal event and a feeder non-squeal event, wherein the predetermined average number of cycles per second is at least five-sixths and less than or equal to two-and-one-half, for a period of time not less than five seconds and not more than fifteen seconds, wherein the predetermined number of cycles further comprises an average ratio of the squeal event to the non-squeal event is at least one and a peak length of one of the predetermined number of cycles is less than 1.5 times a length of an average of each of the feeder squeal event and the feeder non-squeal event in the predetermined number of cycles.

13. The warning system of claim 3, wherein the warning device is a wearable worn by the mother, wherein the output is a multi-stage output wherein a first stage output is an initial irritation to the mother, wherein a second stage output is a stronger irritation, wherein the irritation is a vibration or electrical impulse, wherein the warning device comprises a bi-directional transceiver for communication with the processor for communicating to the processor an "I'm Okay" signal indicative of the warning device functioning properly, wherein the I'm Okay signal provides a confirmation to the processor that the action event was received and the output in response to the action event was provided to the mother, and wherein the I'm Okay signal includes a low battery status alert.

14. The warning system of claim 3, and further comprising a portable housing for the vibratory detector and the processor, wherein the portable housing comprises of a waveguide, and where the vibratory detector comprises two microphones positioned in the waveguide, and the waveguide comprises of a recessed area converging on a front surface in a front of the waveguide and a left wall and a right wall with each of the left wall and the right wall at substantially near a forty five degree angle with respect to the front surface and a depth of the recessed area of substantially near 2.5 inches, wherein the processor further determines a time difference of arrival between the vibratory signal arriving at each of the two microphones to determine a relative position of at least one of the feeders with respect to the two microphones.

15. The warning system of claim 3, wherein the vibratory detector is in direct contact with the mother to detect the vibratory signal from the feeders through the mother, wherein the vibratory detector is a stethophone.

16. The warning system of claim 3, wherein the warning device is a wearable attached to the mother by an adhesive.

17. A method for preventing injury to feeders by a mother in an animal farrowing location, the method comprising:
   detecting with a vibratory detector a vibratory signal from one or more feeders;
   deriving with a processor at least one characteristic of the vibratory signal;
   determining with the processor from the at least one characteristic of the vibratory signal a possible action event;
   determining with the processor from a pattern of possible action events a likely action event;
   providing with a warning device an output in response to the action even, wherein the at least one characteristic of the vibratory signal comprises at least one chosen from a frequency and a magnitude of the vibratory signal;
providing at least one false positive sensor in communication with either the processor or the warning device or both of the processor and the warning device for stopping the output from the warning device upon a predetermined condition; and
   providing at least one chosen from the following false positive sensors:
   a discrete switch for stopping the output from the warning device for a health or safety of the mother;
   an accelerometer worn by the mother, wherein no movement of the mother within a predetermined period of time prior to the likely action event is the predetermined condition for stopping the output from the warning device;
   a transceiver in communication with the processor and in communication with a separate warning system for detecting a vibratory signal from one or more separate feeders in a separate location, wherein in response to receiving an "it is me" signal from the separate warning system, which indicates that the separate warning system detected the vibratory signal from the one or more separate feeders in the separate location, the transceiver communicates to the processor the predetermined condition for stopping the output from the warning device, and a comparator in communication with the processor and with the transceiver and for receiving from the processor a vibratory signal level of the vibratory signal and for receiving from the transceiver a separate vibratory signal level from the separate warning system for detecting the vibratory signal from one or more separate feeders in the separate location, wherein the comparator compares the vibratory signal level to the separate vibratory signal level and wherein the predetermined condition for stopping the output from the warning device occurs when the separate vibratory signal level is greater than the vibratory signal level;
   a timer for stopping the output from the warning device in the event a prior output occurred within a pre-determined period of time;
   a thermometer worn by the mother for determining a temperature of the mother and wherein the predetermined condition for stopping the output from the warning device occurs when the temperature of the mother exceeds a predetermined threshold; and
   a camera in communication with the processor for taking pictures of the mother and determining a relative position between the mother and the one or more feeders, wherein the predetermined condition for stopping the output from the warning device occurs when the relative position indicates that the likely action event is a false positive.

18. The method of claim 17, and further comprising:
translating the vibratory signal to a frequency domain representation of a digitized vibratory signal and deriving therefrom an average sound pressure level, a peak sound pressure level, a plurality of frequency bands, an average magnitude of the plurality of frequency bands, and a peak magnitude of the plurality of frequency bands; and
calculating with the processor a relative magnitude of the plurality of frequency bands from the frequency domain representation of the digitized vibratory signal, and wherein the action event comprises the peak magnitude of the plurality of frequency bands being a multiple of the relative magnitude of the plurality of frequency bands from the frequency domain representation of the digitized vibratory signal, a peak energy of the frequency domain representation of the digitized vibratory signal being a multiple of the average magnitude of the plurality of frequency bands from the frequency domain representation of the digitized vibratory signal, and an average magnitude of the frequency domain representation of the digitized vibratory signal is a percent greater than an average magnitude for a plurality of all frequency domain representations of the digitized vibratory signal;
wherein the possible action event is a squeal from a feeder indicative of the feeder being laid upon by the mother, and wherein the likely action event is a pattern of squeals and non-squeals indicative of the feeder being laid upon by the mother; and
wherein the pattern of possible action events is a predetermined number of cycles between a feeder squeal event and a feeder non-squeal event, and wherein the predetermined number of cycles further comprises an average ratio of the squeal event and the non-squeal event is at least one and a peak length of a one of the predetermined number of cycles is less than 1.5 times a length of an average of each of the feeder squeal event and the feeder non-squeal event in the predetermined number of cycles.

19. A warning system for preventing injury to feeders by a mother in an animal farrowing location, the system comprising:

a detector for detecting a signal from one or more feeders;

a processor in communication with the detector configured with an artificial intelligence module and a library of pre-recorded action events and for comparing the signal with the library of pre-recorded action events and determining a likely action event;

a warning device in communication with the processor for providing an output in response to the likely action event;

a comparator in communication with the processor and with a transceiver and for receiving from the processor a signal level of the signal and for receiving from the transceiver a separate signal level from the separate warning system for detecting the signal from one or more separate feeders in a separate location, wherein the comparator compares the signal level to the separate signal level and wherein a predetermined condition for stopping the output from the warning device occurs when the separate signal level is greater than the signal level.

20. The warning system of claim 19, wherein the detector is a visual detector for detecting a visual signal.

21. The system of claim 19, wherein the detector is a vibratory detector for detecting a vibratory signal.

22. The warning system of claim 19, and further comprising at least one false positive sensor hi communication with either the processor or the warning device or both of the processor and the warning device for stopping the output from the warning device upon a predetermined condition.

23. The system of claim 22, wherein the at least one false positive sensor comprises of a discrete switch for stopping the output from the warning device for a health or safety of the mother.

24. The system of claim 22, wherein the at least one false positive sensor comprises of an accelerometer worn by the mother, wherein no movement of the mother within a predetermined period of time prior to the likely action event is the predetermined condition for stopping the output from the warning device.

25. The warning system of claim 22, wherein the at least one false positive sensor comprises of a transceiver in communication with the processor and in communication with a separate warning system for detecting a signal from one or more separate feeders in a separate location.

26. The warning system of claim 22, and further comprising a thermometer worn by the mother for determining a temperature of the mother and wherein the predetermined condition for stopping the output from the warning device occurs when the temperature of the mother exceeds a predetermined threshold.

27. The warning system of claim 19, wherein the at least one characteristic of the signal comprises at least one chosen from a frequency and a magnitude of the signal.

28. A warning system for preventing injury to feeders by a mother in an animal farrowing location, the system comprising:

a detector for detecting a signal from one or more feeders;

a processor in communication with the detector configured with an artificial intelligence module and a library of pre-recorded action events and for comparing the signal with the library of pre-recorded action events and determining a likely action event:

a warning device in communication with the processor for providing an output in response to the likely action event;

at least one false positive sensor in communication with either the processor or the warning device or both of the processor and the warning device for stopping the output from the warning device upon a predetermined condition, wherein the at least one false positive sensor comprises of a discrete switch for stopping the output from the warning device for a health or safety of the mother, wherein the at least one false positive sensor comprises of an accelerometer worn by the mother, wherein no movement of the mother within a predetermined period of time prior to the likely action event is the predetermined condition for stopping the output from the warning device, and wherein in response to receiving an "it is me" signal from a separate warning system, which indicates that the separate warning system detected the signal from the one or more feeders in a separate location, a transceiver communicates to the processor the predetermined condition for stopping the output from the warning device.

29. The warning system of claim 28, and further comprising a timer for stopping the output from the warning device in the event a prior output occurred within a predetermined period of time.

30. The warning system of claim 29, and further comprising a camera in communication with the processor for taking pictures of the mother and determining a relative position between the mother and the one or more feeders, wherein the predetermined condition for stopping the output from the warning device occurs when the relative position indicates that the likely action event is a false positive.

31. A warning system for preventing injury to feeders by a mother in an animal farrowing location, the system comprising:

a detector for detecting a signal from one or more feeders;

a processor in communication with the detector configured with an artificial intelligence module and a library of pre-recorded action events and for comparing the signal with the library of pre-recorded action events and determining a likely action event:

a warning device in communication with the processor for providing an output in response to the likely action event;

at least one false positive sensor in communication with either the processor or the warning device or both of the processor and the warning device for stopping the output from the warning device upon a predetermined condition, wherein the at least one false positive sensor comprises of a discrete switch for stopping the output from the warning device for a health or safety of the mother, wherein the at least one false positive sensor comprises of an accelerometer worn by the mother, wherein no movement of the mother within a predetermined period of time prior to the likely action event is the predetermined condition for stopping the output from the warning device; and a comparator in communication with the processor and with a transceiver and for receiving from the processor a signal level of the signal and for receiving from the transceiver a separate signal level from the separate warning system for detecting the signal from one or more separate feeders in a separate location, wherein the comparator compares the signal level to the separate signal level and wherein the predetermined condition for stopping the output from the warning device occurs when the separate signal level is greater than the signal level.

* * * * *